Patented Mar. 19, 1946

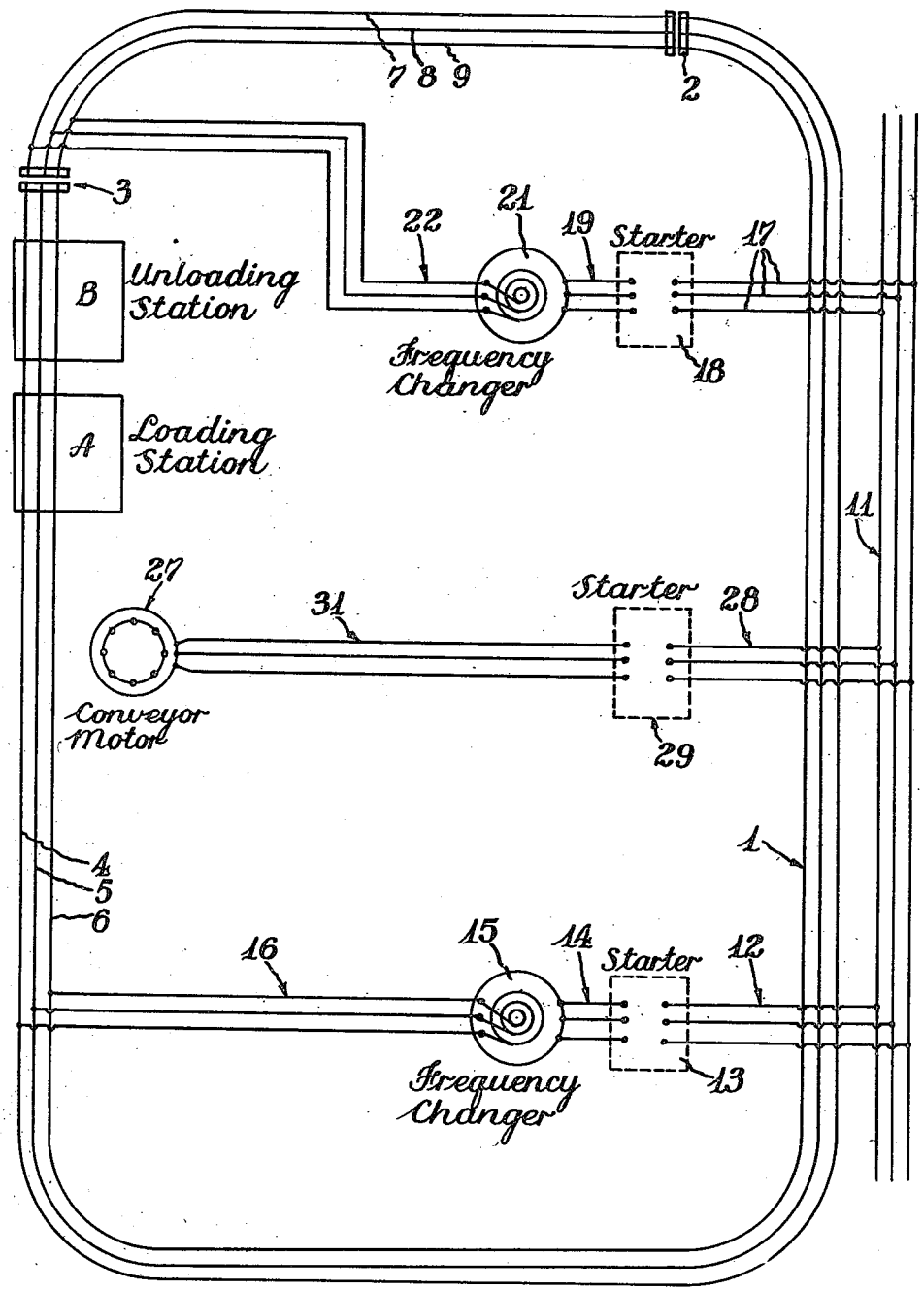

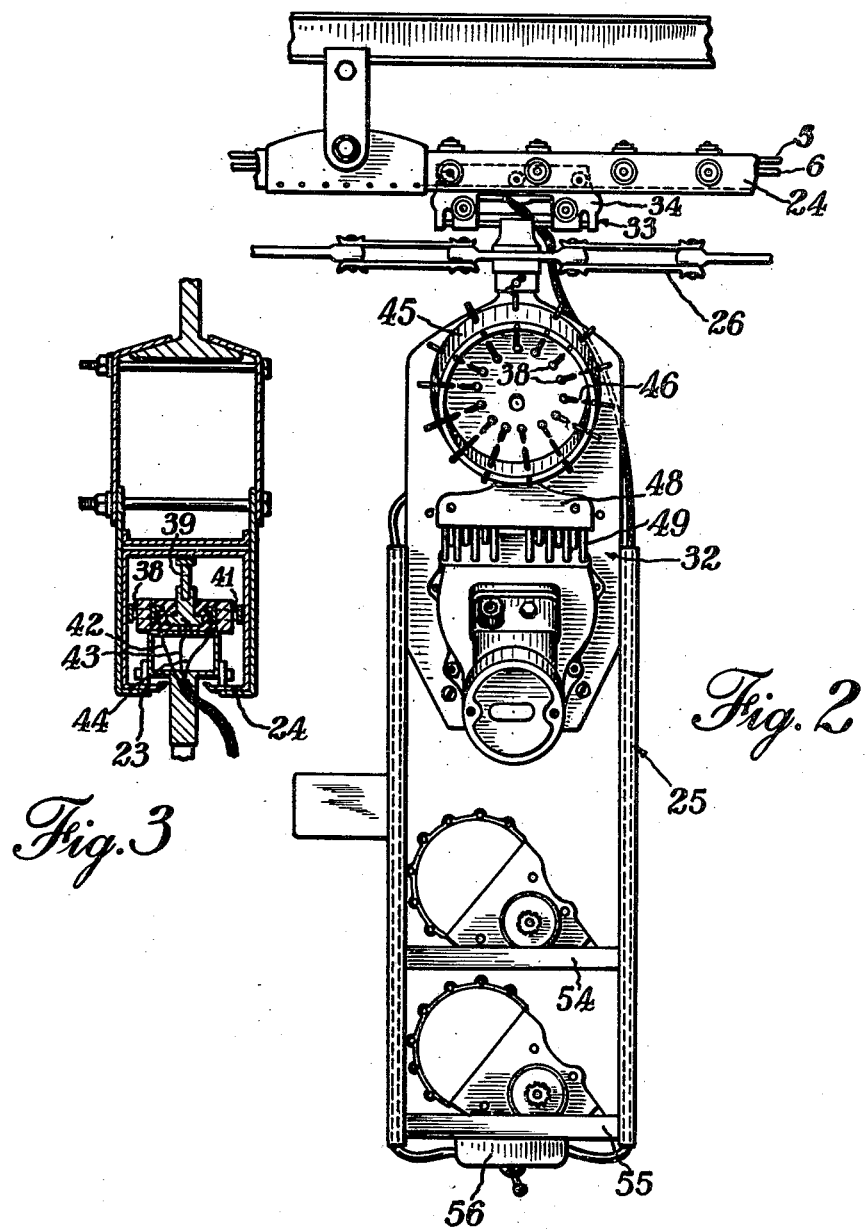

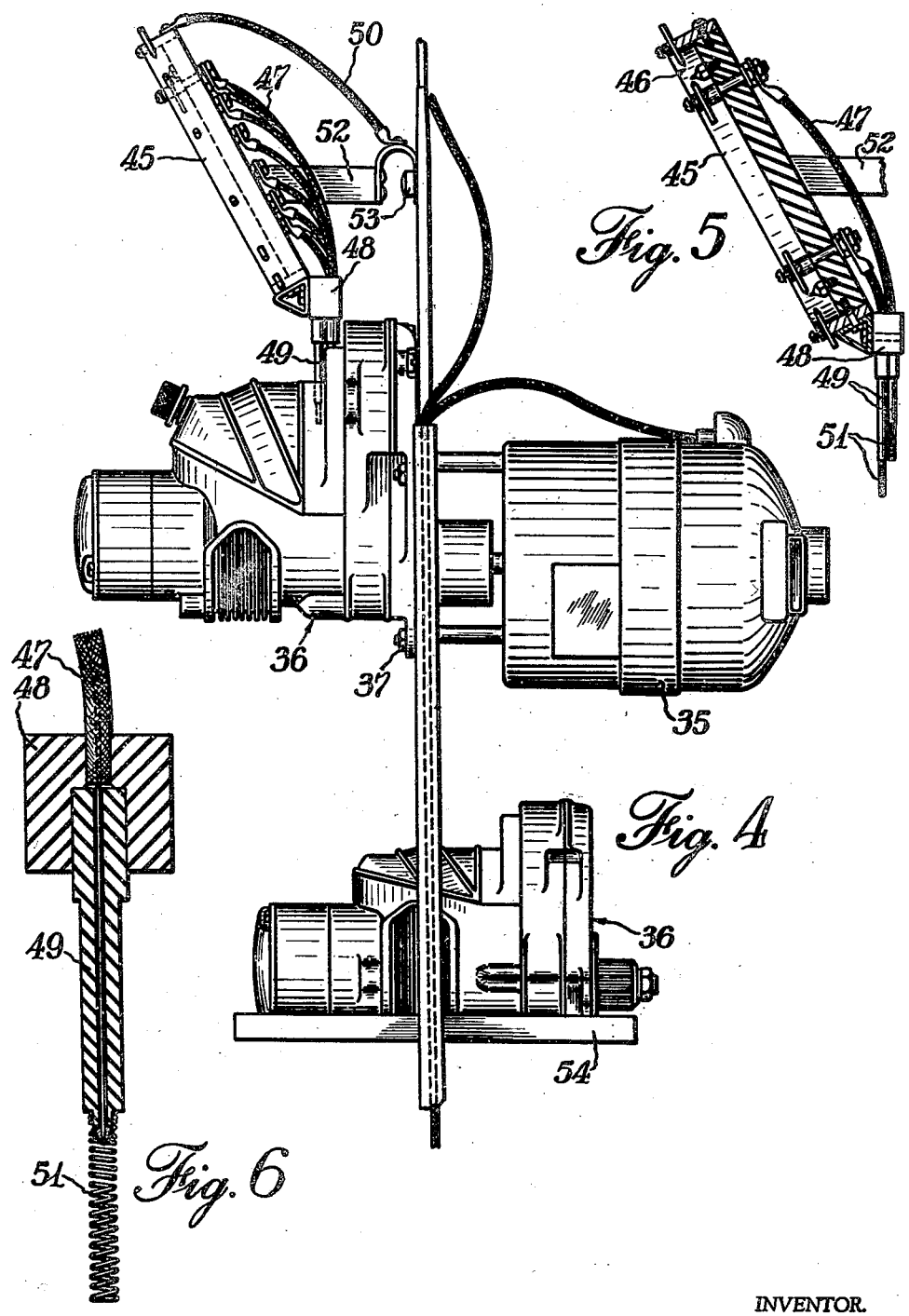

2,396,991

UNITED STATES PATENT OFFICE 2,396,991

MAGNETO TESTING APPARATUS

Manuel H. Elkin, Elmira Heights, N. Y., assignor to Bendix Aviation Corporation, South Bend, Ind., a corporation of Delaware Application April 27, 1944, Serial No. 533,096

8 Claims. (Cl. 175—183)

The present invention relates to magneto testing apparatus and more particularly to a device for automatically running in and testing magnetos at a plurality of selected speeds for regulated periods of time.

In a commercial process of manufacture of high tension ignition magnetos, the completed magnetos are given a so-called green-run test which consists in running each unit for a predetermined period such as six and one half hours at a low speed while observing the output thereof as it discharges across suitable air gaps and then running the units at a high speed for a second period of observation such as one hour. This has heretofore been accomplished by means of rather elaborate test stands having provision for mounting and simultaneous test of a group of magnetos such as a dozen or more. The test stands include motors and change-speed gearing for driving the magnetos at different speeds.

The use of such test stands involves mounting the entire group of magnetos, coupling them to the motor drive and connecting all the output terminals of the magnetos by cables to the spark gaps which are arranged in clusters to facilitate observation. The operator then starts the test run at low speed, continues it for the predetermined period, then shifts the drive to high speed and continues to the completion of the test. The mounting and connecting up of a large group of magnetos especially of the multiple cylinder type which have 14 or more output terminals takes considerable time, and the entire time consumed in mounting and dismounting the magnetos is subtracted from the time available for test purposes. From these considerations, it will be appreciated that each attendant can test only a comparatively few magnetos at a time, and there is a considerable percentage of lost time involved in the operation.

The operation of trucking the magnetos to and from the test stands is also time-consuming and leads to congestion of the factory aisles, while the test stands themselves occupy a large amount of valuable floor space.

It is an object of the present invention to provide a novel magneto testing apparatus which is arranged to operate as a continuous process, the testing of each unit being started as soon as it is mounted and connected up.

It is another object to provide such a device in the form of a conveyer which moves each unit from a loading station to an unloading station in the total time required for the test, whereby the magnetos under test may be located in unused portions of the factory space by raising them above the occupied level thus conserving floor space.

It is a further object to provide such a device in which the conveyer is arranged to carry magnetos which are not under test so that it provides a convenient storage device when manufacture is at a higher rate than the test capacity of the conveyer.

It is a further object to provide such a device in which each unit under test is driven by a motor which receives power from the conveyer track.

It is another object to provide such a device in which said motors are alternating current motors whose speed is dependent on the frequency of the alternating current supply.

It is another object to provide such a device in which the change in speed of the motors required by the test is accomplished for each unit at the proper time by dividing the conveyer track into insulated sections and supplying power to each section at the proper frequency to secure the desired motor speed.

It is another object to provide such a device including means operative on starting up the conveyer for gradually applying the load of the magneto driving motors.

It is another object to provide such a device including a test fixture embodying unitary means for simultaneously connecting all the output terminals of the magneto to a spark gap device.

Further objects and advantages will be apparent from the following description taken in connection with the accompanying drawings in which:

Fig. 1 is a diagrammatic representation of a test conveyer system incorporating the present invention;

Fig. 2 is an enlarged detail of a carrier with magneto mounted thereon and showing a portion of the conveyer track;

Fig. 3 is a sectional view of the conveyer track showing the method of transmitting power therefrom to the magneto driving motors.

Fig. 4 is an enlarged detail in side elevation of a magneto and driving motor mounted on a carrier with the spark gap device attached to the magneto, Fig. 5 is a sectional view of the spark gap device taken substantially on the line 5—5 of Fig. 2, showing the multiple connector plug structure, and Fig. 6 is an enlarged sectional detail of an output connector plug, cable and spring contact.

In Fig. 1 of the drawings there is indicated diagrammatically an endless conveyer track 1 having three conducting rails or bus bars. The conveyer track is divided at points 2 and 3 into two insulated sections; a first section comprising rails 4, 5 and 6 and a second section comprising rails 7, 8 and 9. Three-phase alternating current is supplied to the rails 4, 5 and 6 at a predetermined frequency. For this purpose a commercial source of three-phase alternating current indicated by the mains 11 is connected by cables 12 to a starting control box 13 which in turn is connected by cables 14 to a motor-driven frequency changer 15. In a preferred form of the invention, the alternating current received from the mains 11 at the usual 60 cycle frequency is converted by the frequency changer 15 to a frequency of 65 cycles per second which output is conducted by cables 16 to the rails 4, 5 and 6 of the conveyer track.

Three-phase alternating current is supplied to the rails 7, 8 and 9 at a higher frequency than to rails 4, 5 and 6. For this purpose, cables 17 connect the mains 11 to a starter box 18 which is connected by cables 19 to a motor-driven frequency changer 21. This frequency changer supplies alternating current at a frequency of 100 cycles per second which output is conducted by cables 22 to the rails 7, 8 and 9 of the conveyer track.

In Figs. 2 and 3, a portion of the conveyer track is illustrated comprising a pair of support rails 23 and 24 adapted to form a support for a carrier indicated generally by numeral 25, and the three insulated conducting rails 4, 5 and 6 which receive power from the frequency changer 15.

A continuous chain 26 is arranged to connect the carriers 25 and is moved slowly to draw the carriers around the conveyer track by any suitable means not illustrated. The moving means is powered by a conveyer motor 27 (Fig. 1) which receives its power from the mains 11 by means of cables 28, starter control 29 and cables 31.

Each carrier 25 comprises a frame 32 universally supported as indicated at 33 on a truck 34 which rolls on the support rails 23, 24. A suitable driving motor 35 (Fig. 4), preferably of the induction type, is mounted on the back of the carrier, and the magneto 36 to be tested is mounted detachably on the front of the carrier by any suitable means such as indicated at 37, a suitable coupling connection being provided between the motor and magneto whereby the rotor of the magneto is driven directly by the motor when it is energized.

Means for conducting electrical energy from the conducting rails 4, 5 and 6 to the motor is provided in the form of contact shoes 38, 39, 41 connected to the motor by conductors 42, 43, 44. As stated, the motor is of the induction type so constructed that its rotary speed is proportional to the frequency of the alternating current supplied thereto.

In order that the output of the magneto may be conveniently observed a test fixture embodying a spark gap device is provided for connection to the output terminals of the magneto. As here illustrated this device comprises a holder 45 having a circular cluster of spark gaps 46, one terminal of each of which is connected by an insulated cable 47 to an output terminal of the magneto, the opposite terminals of the spark gaps being grounded as indicated at 50. The cables 47 are brought together in a compound or multiple plug member 48 and project therefrom in parallel arrangement within suitable insulating tubes as indicated at 49 so as to enter the output sockets of the magneto simultaneously when the test fixture is plugged into the magneto. The conductors of cables 47 are preferably terminated by spring extensions 51 in order to insure proper electrical contact with the output terminals of the magneto. The spark gap device 45 of the test fixture is preferably inclined to the vertical to facilitate observation and is held in such position by a bracket member 52 detachably fixed to the carrier frame as shown at 53.

The carrier 25 is preferably provided with shelves 54 and 55 for holding magnetos to be tested, and a switch 56 is conveniently placed on the bottom of the carrier for controlling the energization of the motor 35.

In operation, the carriers which are spaced at convenient distances along the conveyer are set in motion by actuation of the conveyer chain 26 by the conveyer motor 27. The speed of the chain is so coordinated with the length of the conveyer that the carriers traverse the circuit of the conveyer from loading platform A to unloading platform B in the specified total test time. When a carrier reaches the loading station, the operator places a magneto to be tested on the carrier, clutching it to the starting motor which is at this time deenergized, and then plugs in the test fixture with its spark gap device 45 which is thus electrically connected to the output terminals of the magneto. The operator then closes the switch 56 whereupon the motor 35 rotates at a speed corresponding to the frequency of the alternating current supplied to the conducting rails 4, 5, 6. The test at this rate of speed is continued until the carrier passes the intermediate station formed by the junction 2 between the low frequency and high frequency sections of the conveyer track. When the carrier conductor shoes 38, 39, 41 thus come in contact with the rails 7, 8, 9 which are supplied by the frequency changer 21 with alternating current with a frequency of 100 cycles per second, the motor 35 is accelerated to high speed and this speed is then maintained until the carrier has traversed the high frequency portion of the track and reaches the junction 3 with the low speed portion adjacent the unloading station B. When the carrier reaches the unloading station at the completion of its circuit the test is finished, the motor 35 is stopped by opening the switch 56, and the magneto is removed.

It has been found that upon originally starting up the test conveyer the simultaneous acceleration of all the carrier motors 35 throws a very heavy load on the frequency changers. For this reason, it has been found desirable to incorporate a commercial form of time delay in the starter controls for the frequency changers so that the load of the carrier motors is gradually assumed. This time delay starter control forms no part of the present invention and is therefore not more particularly illustrated or described.

Although but one arrangement of a magneto testing device in accordance with the present invention has been illustrated and described in detail, it will be understood that other arrangements are possible and that various changes may be incorporated therein without departing from the spirit of the invention as defined in the claims appended hereto.

What is claimed is:

1. In a magneto testing device individual means for driving each magneto, means for transporting the magnetos from a starting station to a finish station in a predetermined time, means for supplying power to said driving means during the time of transportation, and means for changing the speed of the driving means at a predetermined intermediate station.

2. A magneto testing device as set forth in claim 1, in which the change of speed of the magneto driving means is effected by a predetermined change in the power supply at said intermediate station.

3. In a magneto testing device, a continuous conveyer, spaced carriers thereon movable thereby at such speed as to be transported from a starting station to a finish station in the desired total test time, an electric motor on each carrier for driving a magneto to be tested, means for supplying power to the motors to rotate them at a predetermined speed from the starting station to an intermediate station, and means for supplying power to rotate the motors at a different speed when they pass the intermediate station.

4. A magneto testing device as set forth in claim 3 in which the motors are alternating current motors of a type in which the speed is regulated by the frequency of the power supply and the change of speed is effected by a change in frequency of the power supplied.

5. In a magneto testing device a continuous conveyer, a carrier movable thereby having means for mounting a magneto thereon, an alternating current motor on the carrier for driving the magneto, means for supplying alternating current of one frequency to the motor over a portion of its travel on the conveyer, and means for supplying alternating current of another frequency to the motor over another portion of its travel.

6. In a magneto testing device a conveyer having a circuitous track, and a continuous traction device, means for moving the traction device at a constant speed so regulated that the traction device traverses its circuit in the test period for a magneto, a carrier movable by the traction device having means for mounting a magneto thereon, an alternating current motor on the carrier for rotating the magneto, conductors on the track and carrier for supplying power to the motor, means for supplying alternating current to one section of the track to rotate the magneto, and means to supply alternating current of a higher frequency to another section of the track to rotate the magneto at a higher speed while traversing the latter section of the track.

7. In a magneto test device, a carrier, means for traversing the carrier from a starting station to a finish station, a motor on the carrier for driving a magneto to be tested, and a test fixture comprising a plurality of spark gaps grouped for visual observation corresponding in number to the output terminals of the magneto, a plurality of conductors arranged to contact said terminals and connect them to the spark gap, and means for rigidly mounting the conductors on the fixture in position to engage the magneto terminals in the manner of a compound plug.

8. A magneto test fixture as set forth in claim 7 in which the ends of the conductors forming the compound plug are provided with spring terminals arranged in parallel banks for simultaneous engagement with the output terminals of the magneto to be tested.

MANUEL H. ELKIN.